US009304309B2

(12) United States Patent
Okada

(10) Patent No.: US 9,304,309 B2
(45) Date of Patent: Apr. 5, 2016

(54) LASER-SCANNING MICROSCOPE SYSTEM

(71) Applicant: OLYMPUS CORPORATION, Tokyo (JP)

(72) Inventor: Junichi Okada, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 418 days.

(21) Appl. No.: 13/711,062

(22) Filed: Dec. 11, 2012

(65) Prior Publication Data
US 2013/0147941 A1 Jun. 13, 2013

(30) Foreign Application Priority Data
Dec. 13, 2011 (JP) ................................ 2011-272357

(51) Int. Cl.
G02B 21/00 (2006.01)
G02B 21/36 (2006.01)
H04N 7/18 (2006.01)

(52) U.S. Cl.
CPC ............ *G02B 21/008* (2013.01); *G02B 21/002* (2013.01); *G02B 21/365* (2013.01); *H04N 7/18* (2013.01)

(58) Field of Classification Search
CPC .. G02B 21/002; G02B 21/008; G02B 21/365; H04N 7/18
USPC ........................................................... 348/80
See application file for complete search history.

(56) References Cited

U.S. PATENT DOCUMENTS

| 6,533,381 | B1 | 3/2003 | Chappell et al. | |
| 2006/0129353 | A1* | 6/2006 | Hattori | G02B 21/002 |
| | | | | 702/183 |
| 2007/0291111 | A1* | 12/2007 | Ladha | G02B 21/008 |
| | | | | 348/80 |
| 2009/0322870 | A1 | 12/2009 | Fujiki | |
| 2010/0251438 | A1* | 9/2010 | Huber | G01N 15/1475 |
| | | | | 850/1 |

FOREIGN PATENT DOCUMENTS

| JP | 02176813 A | 7/1990 |
| JP | 10333734 A | 12/1998 |
| JP | 2001091845 A | 4/2001 |
| JP | 2007-011300 A | 1/2007 |
| JP | 2008168024 A | 7/2008 |

OTHER PUBLICATIONS

Japanese Office Action (and English translation thereof) dated Sep. 8, 2015, issued in counterpart Japanese Application No. 2011-272357.

\* cited by examiner

*Primary Examiner* — Thai Tran
*Assistant Examiner* — Stephen Smith
(74) *Attorney, Agent, or Firm* — Holtz, Holtz & Volek PC

(57) ABSTRACT

Repeatability of control items is ensured by improving the precision of time control, and control details for the control items can be changed even when observation is underway. Provided is a laser-scanning microscope system including a microscope apparatus that scans a specimen surface with laser light from a laser light source by using a scanner; a hardware sequencer that controls the microscope apparatus so as to execute a control item that is set in an application program in correspondence with a time axis; and a software sequencer that manages control details for the control item that is set in the application program.

4 Claims, 4 Drawing Sheets

LASER-SCANNING MICROSCOPE SYSTEM

CROSS-REFERENCE TO RELATED APPLICATIONS

This application is based on Japanese Patent Application No. 2011-272357, the content of which is incorporated herein by reference.

TECHNICAL FIELD

The present invention relates to a laser-scanning microscope system.

BACKGROUND ART

In the related art, there are known laser-scanning microscopes (LSM) whose operation is controlled by an application program executed by a CPU provided in a computer. The application program manages a time flow in which control items, such as image acquisitions, performed by the LSM are set along a time axis. The CPU also executes other software at the same time as the application program. Therefore, variations in the execution time of each control item relative to the set time flow are in 100 millisecond units, which is so large that the time precision is insufficient for observing reactions in biological cell etc., which are on the order of 1 millisecond.

In order to cope with such a problem, there are known laser-scanning microscopes that are configured such that a computer is provided with a software sequencer that operates independently of a CPU, and some of the functions that have been executed by a conventional CPU are executed by the software sequencer (for example, see PTL 1). The software sequencer described in PTL 1 executes a preset time flow, and it is not expected to change the conditions of the individual control items during execution of the time flow.

CITATION LIST

Patent Literature

{PTL 1} Japanese Unexamined Patent Application, Publication No. 2007-11300

SUMMARY OF INVENTION

Technical Problem

In the case of PTL 1, if the functionality of the LSM is increased by, for example, adding a scanner, the number of objects to be controlled by the software sequencer is increased, thus increasing the throughput. Thus, variations occur in the execution time of the control items in the same manner as in the conventional configuration.

In addition, when, for example, a living cell is observed for a long period of time using the LSM, the observation conditions may be changed while executing the time flow due to, for example, movement of the cell. If the observation is performed over a short period of time of about a few minutes, variations in the observation conditions can be allowed by relaxing various settings, for example, setting the viewing region to be excessively large. However, if the observation is performed over a long period of time, the amount of variation in the observation conditions also becomes larger; therefore, with the configuration in which the LSM is operated according to a preset time flow, as described in PTL 1, it is difficult to adequately cope with the variations in the observation conditions.

The present invention provides a laser-scanning microscope system that is capable of ensuring repeatability of a control item by improving the precision of time control, and that is capable of changing the control details for the control item even during observation.

Solution to Problem

The present invention provides a laser-scanning microscope system including: a microscope apparatus that scans a specimen surface with laser light from a laser light source by using a scanner; a hardware sequencer that controls the microscope apparatus so as to execute a control item that is set in an application program in correspondence with a time axis; and a software sequencer that manages control details for the control item that is set in the application program.

DESCRIPTION OF EMBODIMENTS

A laser-scanning microscope (LSM) system 100 according to one embodiment of the present invention will be described below with reference to the drawings.

Figure 1:
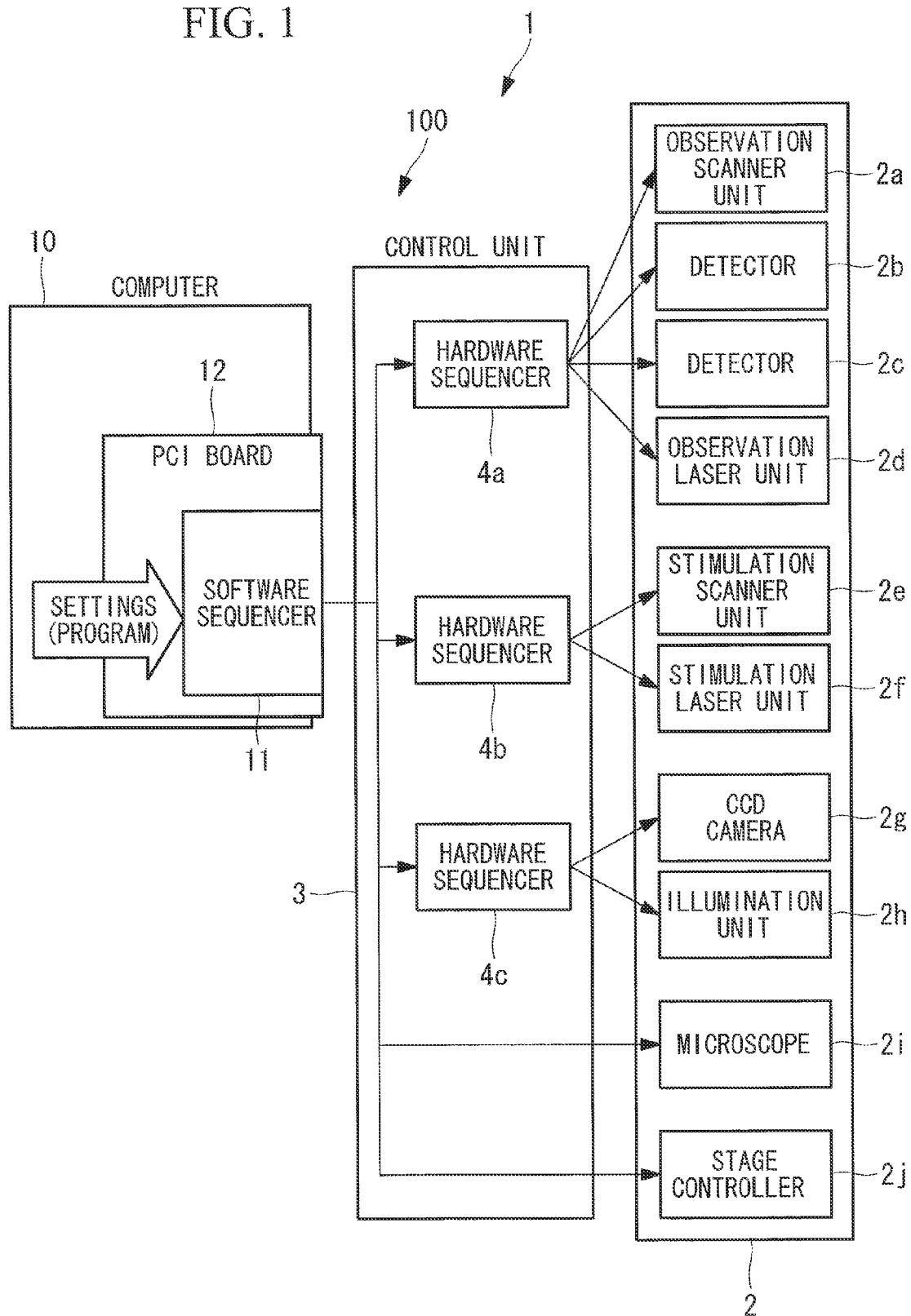
FIG. 1 is an overall configuration diagram of a laser-scanning microscope system according to one embodiment of the present invention.

As shown in FIG. 1, the LSM system 100 according to this embodiment is provided with a microscope apparatus 1 and a computer 10 connected to the microscope apparatus 1 through an interface (not shown).

The microscope apparatus 1 is provided with a main unit 2 and a control unit 3 that controls the operation of respective parts of the main unit 2.

The control unit 3 is provided with a plurality of hardware sequencers 4a, 4b, and 4c (hereinafter, also referred to as hardware sequencers 4, collectively) that respectively correspond to the parts provided in the main unit 2. The control unit 3 causes each of the hardware sequencers 4 to execute a task (a control item) on the main unit 2 and controls, as needed, a microscope 2i and a stage controller 2j, which controls the position of a stage on which a specimen is mounted.

Specifically, one hardware sequencer 4a controls an observation scanner unit (scanner) 2a, detectors 2b and 2c, and an observation laser unit (laser light source) 2d so as to make the main unit 2 execute acquisition of a special-light image of the specimen (not shown). In other words, the hardware sequencer 4a makes the observation scanner unit 2a scan the observation laser light emitted from the observation laser unit 2d and makes each of the detectors 2b and 2c detect special light, such as fluorescence, Raman scattered light, and so forth, emitted from the specimen.

Another hardware sequencer 4b controls a stimulation scanner unit (scanner) 2e and a stimulation laser unit (laser light source) 2f so as to make the main unit 2 execute optical stimulation of the specimen. In other words, the hardware sequencer 4b makes the stimulation scanner unit 2e scan stimulus laser light emitted from the stimulation laser unit 2f, thereby optically stimulating a predetermined region of the specimen.

Another hardware sequencer 4c controls a CCD camera 2g and an illumination unit 2h so as to execute acquisition of a bright-field image of the specimen. In other words, the hardware sequencer 4c makes the illumination unit 2h radiate illumination light onto the specimen, and makes the CCD camera 2g acquire a bright-field image of the illuminated specimen.

Figure 2:
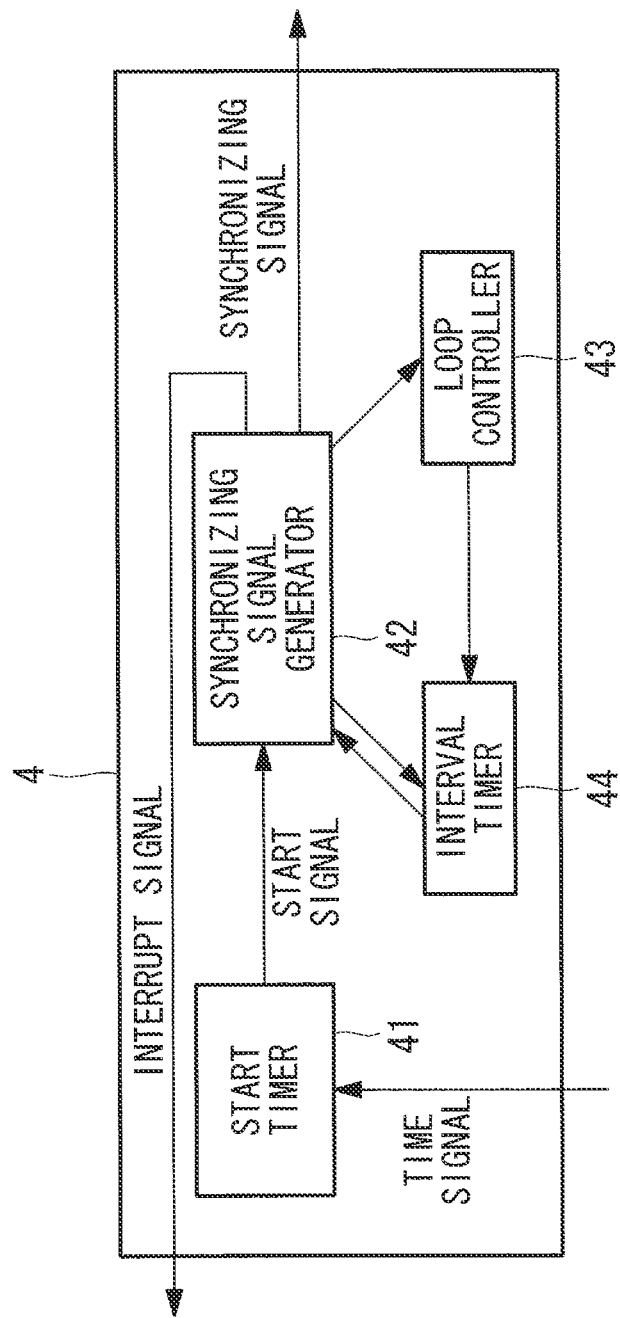
FIG. 2 is a block diagram showing the configuration of a hardware sequencer shown in FIG. 1.

FIG. 2 is a diagram showing an internal configuration of the hardware sequencers 4. As shown in FIG. 2, the hardware sequencers 4 are provided with a start timer 41, a synchronizing signal generator 42, a loop controller 43, and an interval timer 44, and the hardware sequencers 4 make the main unit 2 execute each of the tasks described above in accordance with the control data (control details) stored in the synchronizing signal generator 42.

Specifically, the start timer 41 receives a time signal from a clock (not shown) and outputs a start signal to the synchronizing signal generator 42 when the time signal is equal to a predetermined time. By using the input of the start signal from the start timer 41 as a trigger, the synchronizing signal generator 42 starts to output a synchronizing signal that commands driving of each of the corresponding parts in accordance with the control data, thereby making the main unit 2 execute the task. The synchronizing signal is also output to the interval timer 44 through the loop controller 43.

The synchronizing signal generator 42 outputs an interrupt signal to a software sequencer 11, which will be described later, every time a task is completed, thereby causing an interrupt in the software sequencer 11. At the same time, the interval timer 44 starts to count interval time and outputs the count to the synchronizing signal generator 42. When the interval timer 44 reaches a predetermined interval time, the synchronizing signal generator 42 starts to output the synchronizing signals to the respective parts of the main unit 2 so as to execute the following tasks. As described above, the hardware sequencers 4 manage various types of time, such as the starting time, interval time, and so forth, of each task, and manage the actual operation of the respective parts of the main unit 2.

The computer 10 is provided with a CPU (not shown) and the software sequencer 11, which operates independently of the CPU. The CPU executes an application program that is stored in a memory device (not shown) provided in the computer 10. The application program displays a control table, in which a time axis and tasks are set in correspondence with each other, on a display (not shown) connected to the computer 10. Furthermore, the application program includes a graphical user interface (GUI) that allows an operator to register tasks and to input conditions for each task into the control table using an input device (not shown), such as a mouse, a keyboard, or the like. The conditions for a task include, for example, the scanning modes of the scanner units 2a and 2e, the sensitivities of the detectors 2b and 2c, an ND filter to be inserted in the optical path of the laser light, switching of the optical path, and so forth. The operator can rewrite the control table by registering a task in the control table using the input device or by changing the conditions for a task that has already been registered.

The software sequencer 11 reads out the control table from the memory device through a PCI (Peripheral Component Interconnect) board 12. Then, the software sequencer 11 computes the control data constituting the control details for the respective parts of the main unit 2 in accordance with the details for the next task to be executed by the main unit 2 among the tasks registered in the control table. While waiting for an interrupt signal from the hardware sequencers 4, the software sequencer 11 repeats read out of the control table from the memory device, updating of the starting time setting if there is any change in the conditions for the next task to be executed by the main unit 2, and recomputation of the control data of the respective parts of the main unit 2.

At a predetermined period of time before the starting time of the next task set in the control table, the software sequencer 11 stops read out of the control table, updating of the starting time setting, and recomputation of the control data, and, after receiving the interrupt signal, sends the control data that is the final computation result to the corresponding hardware sequencers 4. In other words, setting of the control data for the hardware sequencers 4 is executed during the interval period. Therefore, the interval period is set so as to be long enough to complete the computation and setting of the control data. By doing so, the software sequencer 11 manages the conditions and execution sequence of tasks set in the control table by the operator.

Figure 3A:
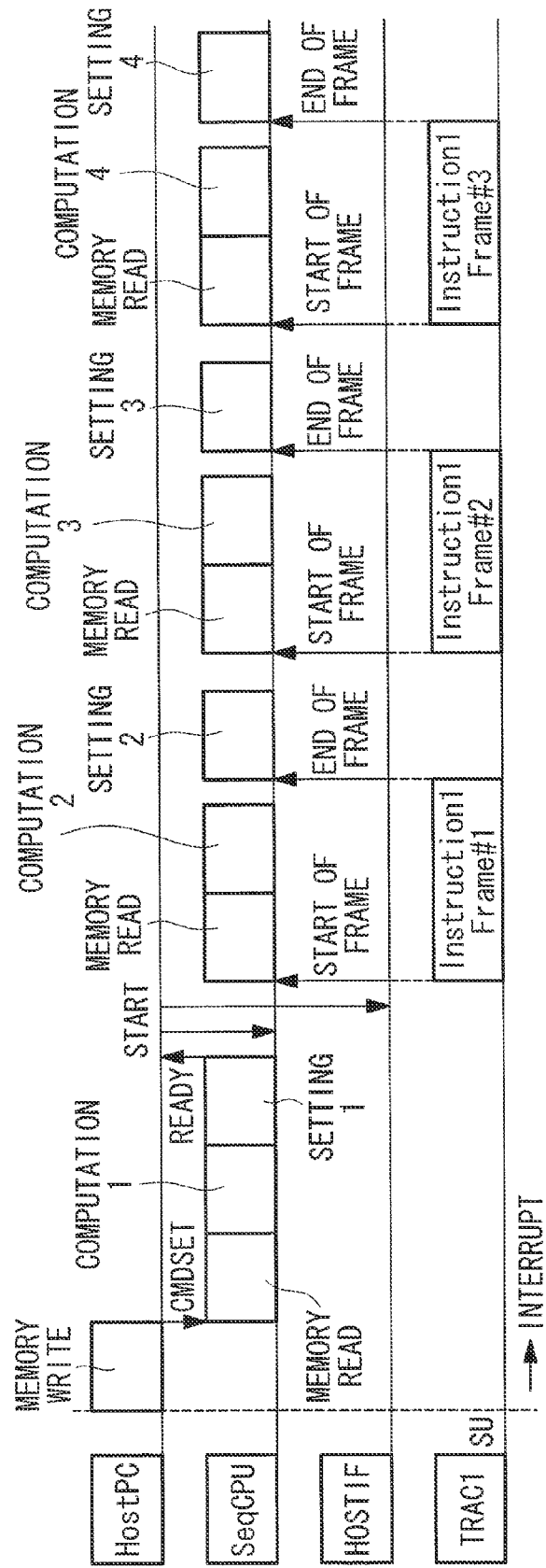
FIG. 3A is a time chart showing an example operation of the laser-scanning microscope system shown in FIG. 1.
Figure 3B:
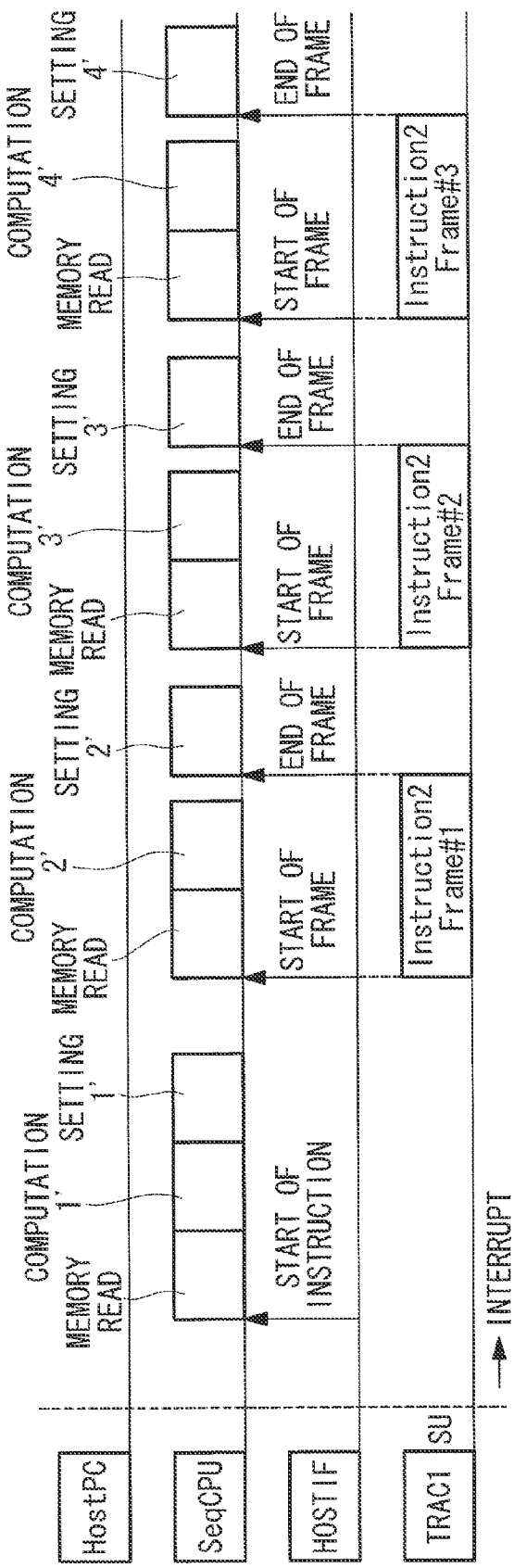
FIG. 3B is a time chart showing an example operation of the laser-scanning microscope system shown in FIG. 1.

The operation of the thus-configured LSM system 100 will be described next, with reference to FIG. 3A and FIG. 3B. FIG. 3A and FIG. 3B show an example operation of the LSM system 100 when the scanning mode of the observation scanner unit 2a is set to an XYZ mode and a task in which a plurality of special-light images of the XY plane are acquired while moving the position of the field of view in the Z direction is executed. The XY direction indicates the horizontal direction, and the Z direction indicates the vertical direction.

As shown in FIG. 3A, after a task and the conditions therefor are written into a control table stored in the memory device in the computer (HostPC) 10 by using a GUI (MEMORY WRITE), the software sequencer (SeqCPU) 11 reads out the control table (MEMORY READ) and performs computation and setting of the control data for a first task.

In this embodiment, the first task consists of a plurality of repeated subtasks that acquire one image. In such a case, the software sequencer 11 computes control data for acquiring a first image, which is a first subtask (COMPUTATION 1), and performs setting of the computed control data by sending the control data to the synchronizing signal generator 42 of the hardware sequencer (TRAC1) 4a through an interface (HOSTIF) (SETTING 1). After confirming the completion of setting of the control data (READY), the CPU commands the software sequencer 11 and the hardware sequencer 4a to start the control using the control table (START).

Next, the hardware sequencer 4 monitors the time with the start timer 41, waits until the starting time, and then starts the control of the main unit 2 for acquiring the first image (START OF FRAME, Instruction1 Frame #1). While the hardware sequencer 4 is making the main unit 2 execute acquisition of the first image, the software sequencer 11 reads out the control table from the memory device (MEMORY READ) and generates the control data for acquiring a second image by computing the control data (COMPUTATION 2).

After completing the control for acquisition of the first image, the hardware sequencer 4 sends a signal notifying that to the software sequencer 11 (END OF FRAME), receives the control data for acquiring the next image from the software sequencer 11, and sets the control data in the synchronizing signal generator 42 (SETTING 2). At the same time as this, the hardware sequencer 4 starts counting subinterval time using the interval timer 44. The subinterval time is set so as to be long enough to complete the setting of the control data in the synchronizing signal generator 42. The hardware sequencer 4 waits until the count taken by the interval timer 44 reaches a predetermined time period and starts the control of the main unit 2 for acquiring the second image (START OF FRAME, Instruction1 Frame #2).

While counting the number of image acquisitions already executed based on the notifications from the hardware sequencer 4, the software sequencer 11 sequentially sends the control data for acquiring a plurality of images at different positions of the field of view to the hardware sequencer 4.

The LSM system 100 repeats the subtasks in the manner described above and completes the first task by acquiring special-light images at all Z positions. Note that, besides the XYZ mode, the scanning mode of the observation scanner unit 2a includes an XY mode, an XYT mode, an XYZT mode, an XZT mode, an XZ mode, an XT mode, and so forth. The T direction indicates the time axis.

As shown in FIG. 3B, after completing the first task, the hardware sequencer 4 outputs the interrupt signal to the software sequencer 11 (START OF INSTRUCTION). After receiving the interrupt signal, the software sequencer 11 reads out the control table from the memory device (MEMORY READ), computes the control data for a second task (COMPUTATION 1'), and sets the control data in the hardware sequencer 4 (SETTING 1'). FIG. 3B shows a case in which a task that acquires a series of images in the XYZ mode, where the Z position of the field of view is moved every frame, for example, is executed as the second task. Because the rest of the second task is the same as that in the first task, a description thereof will be omitted.

As described above, according to this embodiment, among the functions needed to execute a task, the function related to the management of time is assigned to the hardware sequencer 4, and the other functions are assigned to the software sequencer 11. By doing so, the hardware sequencer 4 can make the main unit 2 execute tasks set in the control table as scheduled, and it is possible to improve the precision of time control to ensure repeatability of the tasks. In addition, by performing time management related to the tasks with the hardware sequencer 4, it is easy to combine a plurality of time axes at the same time. For example, it is possible to change the interval time for the Z axis and T axis, respectively, and it is also possible to ensure high time precision on a time-scale shorter than microseconds.

In addition, because the software sequencer 11 is not required to manage time and is only required to perform processing in accordance with the interrupt signal, notifications, and so forth from the hardware sequencer 4, it is possible to reduce the load on the software sequencer 11. In addition, by reducing the load on the software sequencer 11 in this way, it is possible to ensure sufficient time precision even if one software sequencer 11 is assigned to manage the control data of a plurality of hardware sequencers 4a and 4b independently provided for the respective scanner units 2a and 2e.

In addition, the control data for a task or a subtask is set from the software sequencer 11 to the hardware sequencer 4 just before the task or the subtask is executed by the main unit 2. In other words, even after execution of a series of tasks that are set in the control table has started, by inputting the changes in the conditions for the next task or subtask into the control table of the application program by using the GUI before rewriting of the control data for the next task or the subtask is completed, it is possible to reflect the changes in the control data for the next task or subtask. By doing so, for example, even if a living cell serving as a specimen has moved and the settings of the stage controller 2j need to be changed, it is possible to quickly change the settings therefor to change the conditions for the task or the subtask in real time in accordance with the changes in the observation conditions.

Note that, in this embodiment, the software sequencer 11 may be able to choose if a task set in a control table is to be executed or not executed. In this case, the GUI is configured so that it is possible to delete a task that has been set in the control table. After the read out of the next task or subtask from the memory device and computation of the control data have been started, if the task or subtask has been deleted from the control table, the software sequencer 11 stops computation of the control data and deletes the computation result. By doing so, the task or subtask can be cancelled just before it is started.

The following invention can be derived from the above-described embodiment.

The present invention provides a laser-scanning microscope system including: a microscope apparatus that scans a specimen surface with laser light from a laser light source by using a scanner; a hardware sequencer that controls the microscope apparatus so as to execute a control item that is set in an application program in correspondence with a time axis; and a software sequencer that manages control details for the control item that is set in the application program.

According to the present invention, the hardware sequencer makes the microscope apparatus execute the control item that is set in the application program, thereby enabling acquisition of an image etc. The software sequencer manages the control details of the control item that is set in the application program.

As described above, the function of executing the control item is assigned to the hardware sequencer, and the function of managing the other control details is assigned to the software sequencer, whereby it is possible to operate the microscope apparatus according to the settings in the application program and to improve the precision of time control, thus ensuring repeatability of the control item. In addition, even after the execution of a series of control items that are set in the application program has been started, the software sequencer can change the control details for unexecuted control items, whereby the hardware sequencer can make the microscope apparatus execute the changed control items.

In the above-mentioned invention, the hardware sequencer may control an execution time of the control item and a scanning mode of the scanner, and the software sequencer may manage a condition and a sequence of the control item.

In the above-mentioned invention, the hardware sequencer may generate an interrupt to the software sequencer just before a starting time of the control item, and the software sequencer may be able to change the control item up until the starting time by means of the hardware sequencer.

By doing so, just before the hardware sequencer makes the microscope apparatus execute the control item, an opportunity to change the control details for the control item by the software sequencer is provided. Thereby, even when the observation conditions have changed, it is possible to quickly change the control details in accordance with the change thereof.

In the above-mentioned invention, the hardware sequencer may include a timer, which manages the starting time of the control item, and output an interrupt to the software sequencer at a predetermined period of time before the starting time, and the software sequencer may send a next control item to be executed by the microscope apparatus to the hardware sequencer after receiving the interrupt from the hardware sequencer.

By doing so, every time the microscope apparatus completes one control item, the software sequencer sends the next control item to be executed by the microscope apparatus and the control details thereof to the hardware sequencer. It is possible to further improve the degree of freedom in the settings for the control items by sending the control items one-by-one from the software sequencer to the hardware sequencer in this manner.

REFERENCE SIGNS LIST

1 microscope apparatus
2 main unit
2a observation scanner unit (scanner)
2b, 2c detector
2d observation laser unit (laser light source)
2e stimulation scanner unit (scanner)
2f stimulation laser unit (laser light source)
2g CCD camera
2h illumination unit
2i microscope
2j stage controller
3 control unit
4a, 4b, 4c hardware sequencer
10 computer
11 software sequencer
12 PCI board
41 start timer
42 synchronizing signal generator
43 loop controller
44 interval timer
100 laser-scanning microscope system

The invention claimed is:

1. A laser-scanning microscope system comprising:
a microscope apparatus that scans a specimen surface with laser light from a laser light source by using a scanner;
a software sequencer that (i) reads out, from a memory, a control item set in an application program in correspondence with a time axis, and (ii) computes control data which controls the microscope apparatus, wherein the software sequencer does not execute the application program; and
a hardware sequencer including a start timer, a synchronizing signal generator, an interval timer, and a loop controller, wherein the hardware sequencer outputs a synchronizing signal for controlling the microscope apparatus so as to execute the control item that is set in the application program in correspondence with the time axis.

2. A laser-scanning microscope system according to claim 1, wherein:
the hardware sequencer controls an execution time of the control item and a scanning mode of the scanner, and
the software sequencer manages a condition and a sequence of the control item.

3. A laser-scanning microscope system according to claim 1, wherein:
the hardware sequencer generates an interrupt to the software sequencer just before a starting time of the control item, and
the software sequencer is capable of changing the control item until the starting time.

4. A laser-scanning microscope system according to claim 3, wherein:
the interval timer of the hardware sequencer manages the starting time of the control item, and the hardware sequencer outputs the interrupt to the software sequencer at a predetermined period of time before the starting time, and
the software sequencer sends a next task to be executed by the microscope apparatus to the hardware sequencer after receiving the interrupt from the hardware sequencer.

* * * * *